May 12, 1964  R. S. POSTLE ETAL  3,132,825
SPACE-ATMOSPHERE VEHICLE
Filed Sept. 25, 1961  6 Sheets-Sheet 1

INVENTORS
ROBERT S. POSTLE
JEROME L. MICHAELS
CAMPBELL HENDERSON
BY
Beau, Brooks, Buckley + Beau
ATTORNEYS

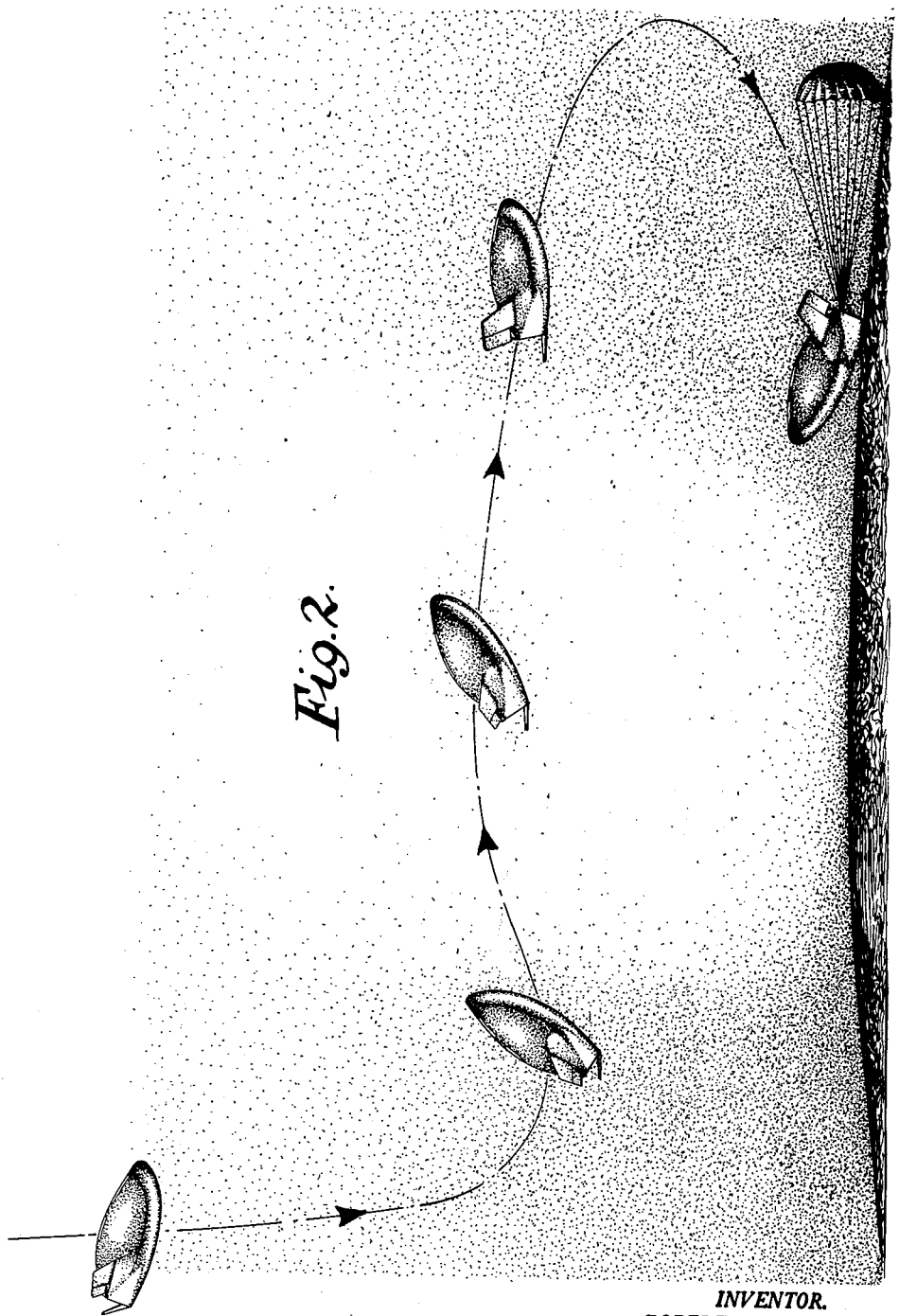

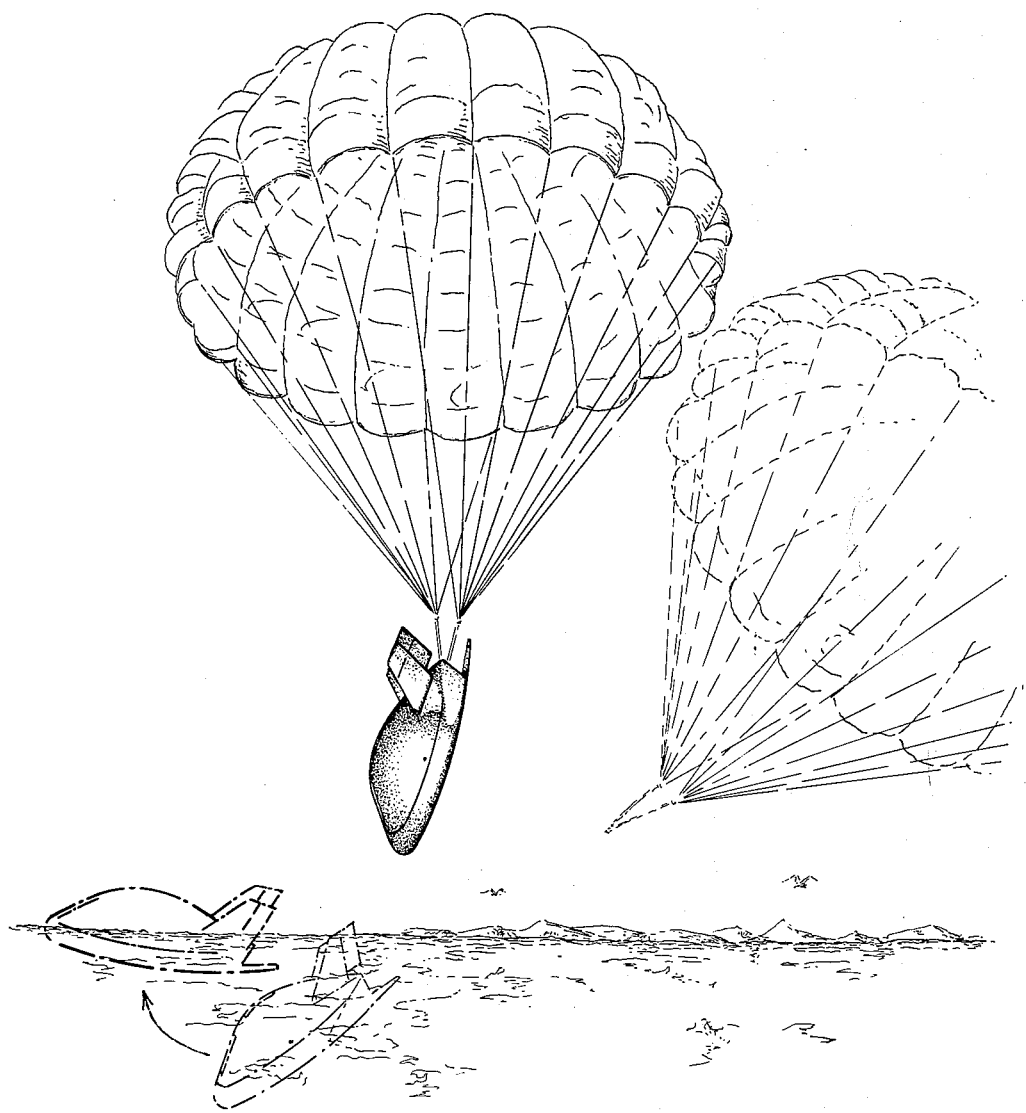

May 12, 1964 R. S. POSTLE ETAL 3,132,825
SPACE-ATMOSPHERE VEHICLE
Filed Sept. 25, 1961 6 Sheets-Sheet 4

INVENTOR.
ROBERT S. POSTLE
JEROME L. MICHAELS
BY CAMPBELL HENDERSON

Bean, Brooks, Buckley & Bean
ATTORNEYS

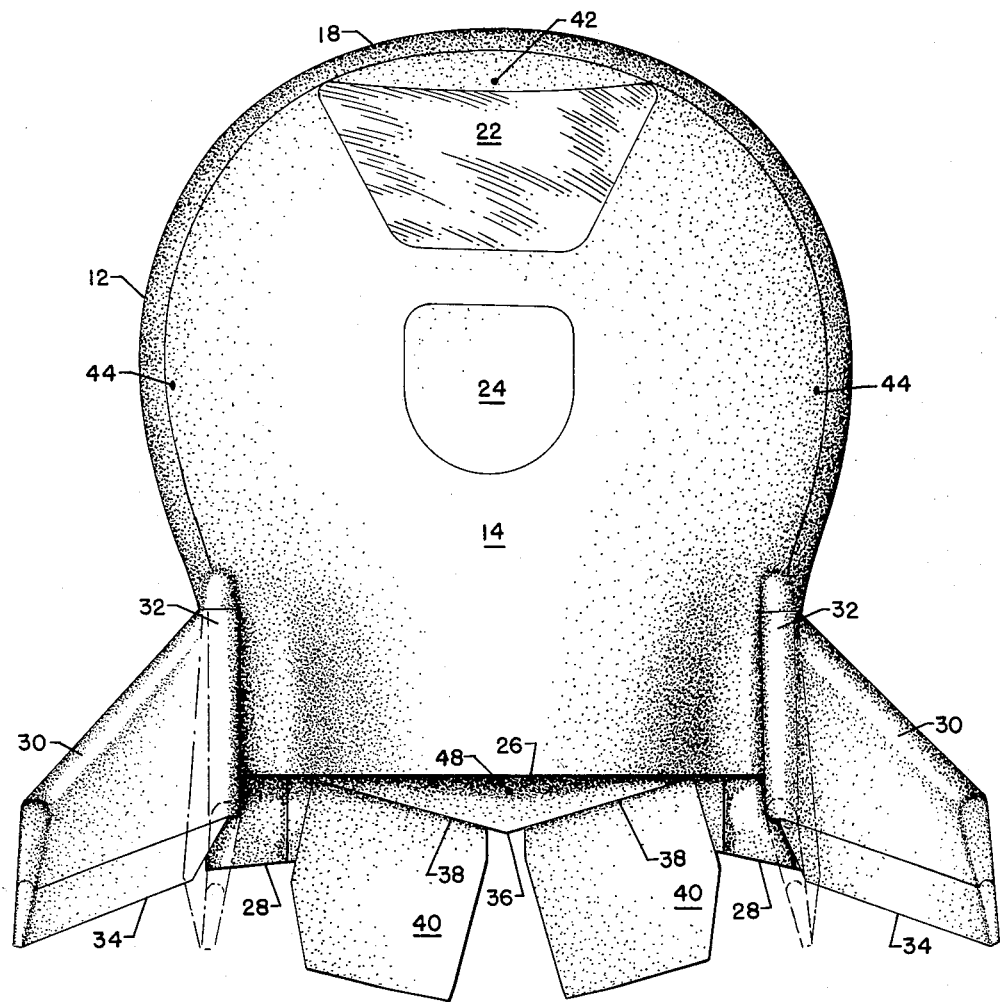

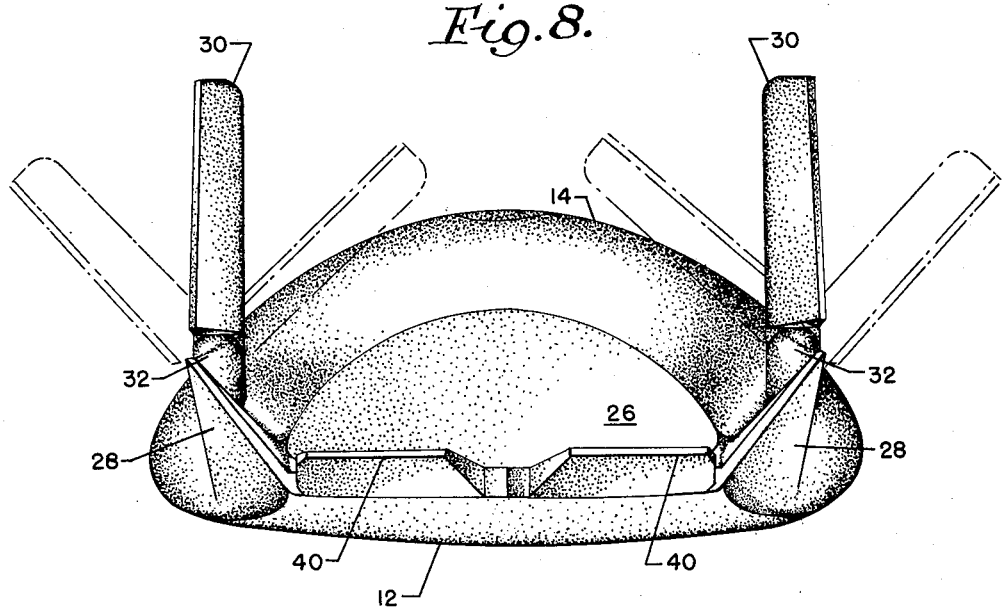

United States Patent Office

3,132,825
Patented May 12, 1964

3,132,825
SPACE-ATMOSPHERE VEHICLE
Robert S. Postle, Williamsville, Jerome L. Michaels, Amherst, and Campbell Henderson, Grand Island, N.Y., assignors to Bell Aerospace Corporation, Wheatfield, N.Y.
Filed Sept. 25, 1961, Ser. No. 140,343
10 Claims. (Cl. 244—1)

This invention relates to aerospace vehicles, and more particularly to manned vehicle fuselage constructions and configurations, and to aerodynamic surface and control and landing skid arrangements thereof.

It is one object of the present invention to provide an improved body shape for aerospace vehicles as aforesaid whereby the vehicle is adapted to earth-orbital or deep space missions, and to re-enter the earth's atmosphere at escape velocity while still possessing conventional earth landing capabilities.

More specifically, the invention contemplates use of an improved combination of fuselage aerodynamic configuration characteristics and control devices therefor providing utilization of aerodynamic lift and drag for re-entry, and trimming capabilities at high angles of attack while traveling at hypersonic speed as well as at low angles of attack for conventional gliding control and power-off earth-surface landings.

Another object of the invention is to provide an improved vehicle configuration for the purposes aforesaid, embodying minimum weight with maximum volume shape and pressure vessel efficiency; thus providing a compact body shape requiring minimum skin support frame and stringer devices.

Another object is to provide an improved vehicle configuration as aforesaid whereby the crew may be positionally supported in various attitudes best suited to accommodate differently directed accelerations for full time functional efficiency, and whereby the crew may be provided with improved environmental view.

Another object of the invention is to provide an improved vehicle configuration as aforesaid capable of entering the atmosphere in a manner which presents a relatively large radius surface to the incident airstream, thereby reducing the stagnation temperature," thus minimizing the requirements for heat protection during re-entry; while at the same time providing improved inherent aerodynamic stability.

Another object is to provide an improved manned vessel configuration as aforesaid having improved manual control means whereby crew-guidance of the vehicle is facilitated throughout all phases of space travel, re-entry, and landing.

Another object is to provide an improved configuration as aforesaid which is adapted to be navigated precisely within a range including pure ballistic travel at 90 degrees angle of attack and lifting flight travel down to 50 degree angle attack, while being aerodynamically stable at all intermediate values of L/D.

Another object is to provide in conjunction with a vehicle as above, an improved combinational arrangement of aerodynamic flaps and reaction jet nozzles, to provide for improved crew guidance control such as to compensate for example for any errors in remote control of the re-entry angle, thus minimizing the required accuracy of the remote control apparatus.

Another object is to provide an improved arrangement as aforesaid permitting modulation of the L/D ratio during re-entry, thereby permitting the crew to correct the nominal trajectory and to take advantage of the high L/D ratio for down range glide control; and to generally facilitate management of the kinetic energy of the vehicle during re-entry and landing.

Another object of the invention is to provide an improved vehicle arrangement as aforesaid embodying effective aerodynamic control facilities for guidance while traveling through atmosphere, permitting trim at any desired attitude, and facilitating kinetic energy management.

More specifically, another object is to provide an improved aerodynamic shape which is trimmable at all angles of attack between 0° and 90° thus giving complete control of the lift-to-drag ratio during re-entry at hypersonic speeds into the atmosphere. The high lift-to-drag ratio at hypersonic velocities results in reduced guidance and propulsion requirements, reduced re-entry heating, reduced re-entry deceleration, increased cross range maneuverability, and improved aerodynamic control of energy management.

Another object is to provide an improved vehicle construction as aforesaid which adapts the vehicle to glide-landing techniques on land or water, thereby reducing landing impact shocks and danger of landing accidents; while at the same time facilitating employment of simple crew-recovery techniques.

Another object is to provide an improved vehicle configuration as aforesaid characterized by a relatively small frontal area, whereby the vehicle is adapted for vertical descents into water without shock impact difficulties.

Another object is to provide an improved configuration as aforesaid whereby the vehicle is inherently adapted to float on water in stable manner.

Other more specific objects and advantages of the invention will appear from the specification hereinafter, and by reference to the accompanying specification and drawing wherein:

FIG. 2 is a diagrammatic illustration of a technique for maneuvering the vehicle during an atmosphere re-entry and landing operation;

FIG. 4 illustrates a water landing technique for the vehicle;

FIG. 7 is a top plan view thereof; and

FIG. 8 is a rear view thereof.

Figure 5:
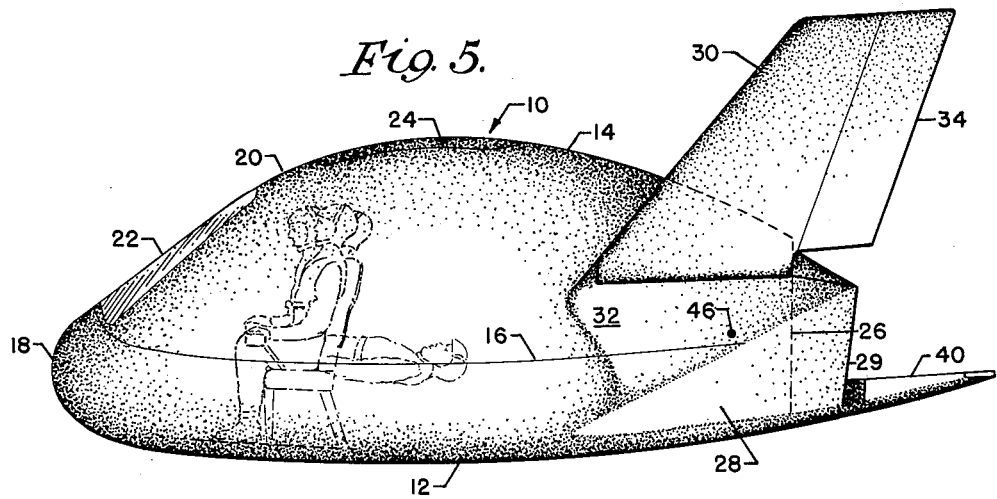
FIG. 5 is a side elevational view of a capsule of the invention.
Figure 6:
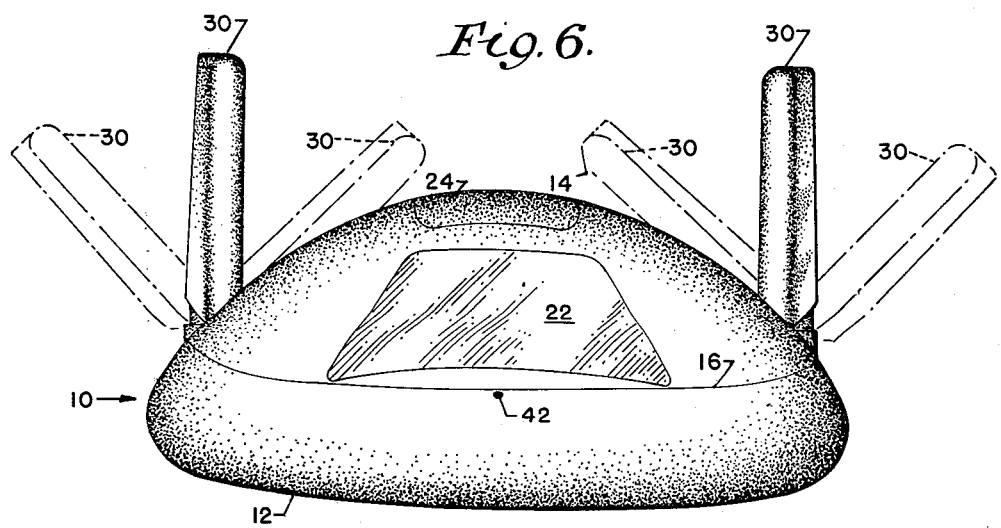
FIG. 6 is a front view thereof.

Generally stated, the invention contemplates an atmosphere entry vehicle configuration which as shown in the accompanying drawing may be described as being of modified lens form; the bottom section 12 of which is convex dish-shaped bottom surface form while the upper section 14 of which is of deformed convex surface shape. Preferably, the vehicle structure will be fabricated to comprise the two major portions (bottom section 12 and top section 14) to be surfaced with different skin structures; the bottom section 12 to have a skin structure of especially high heat resistance and conductivity characteristics and joined to the upper section 14 as along line 16. The purpose of the high heat resistance construction of the bottom section will be explained hereinafter. As shown in plan view (FIG. 7), the configuration features a generally circular form including a smoothly rounded leading edge 18 extending at opposite sides in smooth continuity with somewhat straightened side walls terminating in a truncated rear end. As shown in FIG. 5, the top wall of the upper section 14 nose-slopes toward the leading edge 18, and thus provides an effective area for inclusion of a windshield such as indicated at 22 to provide the crew with good environmental visibility.

This configuration is ideally suited to utilize aerodynamic lift and drag for re-entry, and to provide improved capabilities for landing in accord with generally conventional type landing techniques at any preselected point. For example, this modified lenticular configuration is adapted to enter the earth's atmosphere after space travel, at hypersonic velocities at attitudes above that for $C_{L_{Max}}$, using a controllable range of lift-to-drag ratio between 0 and 1.0 to widen the re-entry angle corridor. Additional range corrections are obtainable by rolling the vehicle about the relative wind vector, as by means of thrust jets or aerodynamic control surfaces as will be explained hereinafter, to produce any desired net side-range or down-range corrections of the flight path. At lower hypersonic or supersonic speeds the vehicle may make use of the higher lift-to-drag ratios which are available at attitudes below that for $C_{L_{Max}}$.

Figure 1:
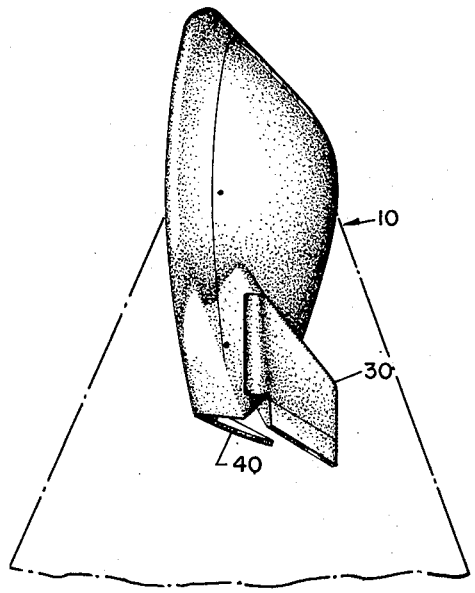
FIG. 1 is a side elevational view of a vehicle of the invention illustrating the mode of mounting it for take-off purposes.

As is shown in FIG. 5 the side view contour of the capsule is ideally suited to crew accommodation; the longitudinal mid portion of the capsule being of maximum vertical thickness to accommodate seated or standing personnel directly behind the windshield 22. Thus, the crew seats may be arranged in side-by-side relation to extend across the plan view width of the vessel, and may be posture-adjustable to also accommodate the crewmen in reclining attitudes to better withstand take-off accelerations as when fired from a missile or the like as indicated at FIG. 1. A passenger entrance-exit hatch may be conveniently provided as indicated at 24 in the top center of the upper section.

Figure 3:
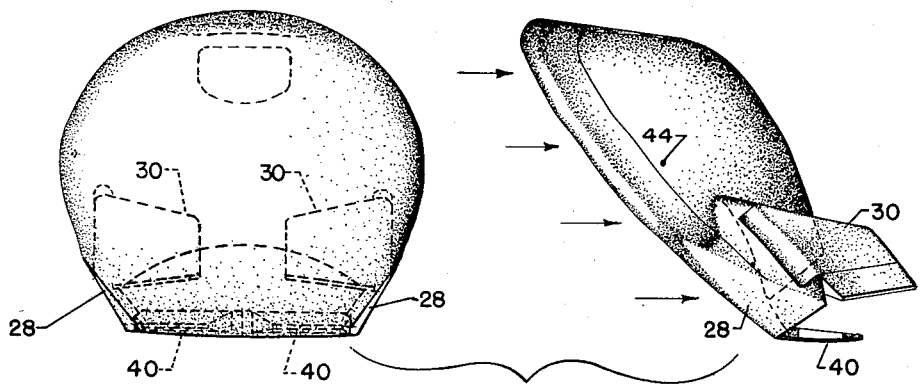
FIG. 3 is a composite frontal and projected side elevational view of the vehicle during a 70° angle of attack atmosphere re-entry maneuver.

The rear end of the vessel is truncated as indicated at 26, and as more clearly shown in FIGS. 3, 5 and 8 the wall portions at opposite sides of the body immediately adjacent the rear end are shaped to provide dihedrally disposed plane surfaces 28—28 which function aerodynamically to give the vehicle flight stability in yaw when the vehicle is traveling through atmosphere at high angles of attack, such as for example as illustrated at the left hand side of FIG. 2 and at FIG. 3 of the drawing herewith. Flight stability when traveling at low angles of attack such as illustrated at the right hand side of FIG. 2, is derived from the blunt leading edge of the structure when traveling at hypersonic speeds and when traveling at supersonic and subsonic speeds by means of generally dihedrally disposed control surfaces 30—30 which are hingedly mounted alongside the rear end of the structure as indicated at 32—32. The surfaces 30—30 may be provided with tabs 34—34 to facilitate the control effects, as is well known in the art. At the rear end, as shown in FIG. 7, the structure includes a rearwardly extending triangular shaped shelf 36 to which are hingedly connected at 38—38 a pair of elevons 40—40 which are arranged to be selectively pitch-controlled for pitch and roll aerodynamic control of the craft.

Thus, the variably dihedral fin surfaces 30—30 provide for trim of the craft at low angles of attack and during final approach and landing maneuvers; the configuration being aerodynamically stable in pitch and yaw at all attitudes in the normal flight modes. The movable surfaces 30—30 provide directional stability and roll-yaw control, and add to the longitudinal stability during transition from high to low angles of attack, and provide additional aerodynamic control at low subsonic speeds and when landing.

Rocket engines are carried by the vehicle for attitude control thereof whenever operating under conditions when the aerodynamic surfaces are ineffective. For example, as illustrated at 42 a rocket nozzle may be provided at the nose of the vehicle to point upwardly, for pitching the nose downwardly upon operation of the nozzle. Upwardly directed nozzles as indicated at 44—44 may be disposed at each side of the vessel midway of its length, for roll control purposes. A pair of laterally directed nozzles 46—46 may be disposed at opposite sides of the vehicle offset from its yaw axis, such as at the rear of the vehicle (FIG. 5) to provide for yaw attitude control; and another vertically directed nozzle may be disposed at the rear of the vehicle as indicated at 48 (FIG. 7) to pitch the nose of the vehicle upwardly upon actuation of the control.

It is a particular feature of the present invention that the movable control surfaces 30, 34 and 40 are all disposable behind the frontal area of the vehicle when the vehicle is disposed at attitudes in the neighborhood of 70° or greater relative to the air thrust vector. Hence, the vehicle may be brought from space into an atmosphere for re-entry and landing purposes as illustrated diagrammatically in FIG. 2 without overheating disaster to the movable control surfaces. For example, as shown at the left hand side of FIG. 2 of the drawing herein, the attitude of the vehicle may be thrust-jet controlled during the re-entry operation so as to initially dispose the vehicle at a substantially flatwise or 90° angle of attack relative to the travel path, with the bottom areas of the vehicle taking the brunt of the air-friction heating. As the vehicle speed decreases due to air resistance to its passage, the attitude of the vehicle may be slowly changed to progressively lower angles of attack, and the control surfaces may then later be safely extended into the relative air stream in order to provide aerodynamic control of the glide path. Thus, in proper time the travel path may be diverted horizontally as shown in FIG. 2 while the vessel is maintained at high angle of attack attitude until the travel velocity is reduced sufficiently to enable the vessel to enter a conventional type approach and landing maneuver, such as is illustrated at the right hand side of FIG. 2.

It will be appreciated that as explained hereinabove the kinetic energy of the system may thus be managed so as to preclude overheating of the skin structure of the vessel as well as heat damage to the movable control surfaces, whereby the latter remain functional for subsonic flight and approach and landing control purposes. FIG. 3 illustrates how the control surfaces are fully retractable behind the frontal area of the vessel when it is disposed for example at an approximately 70° angle of attack, whereby the relatively fragile control surfaces are withdrawn out of the relative air stream and thereby protected against overheating.

In the landing configuration, with the control surfaces folded out, the modified lenticular shape of the vehicle provides for improved gliding capabilities. For example, the flareout and the touchdown can be accomplished at normal airplane landing velocity. The relatively high touchdown angle of attack arrangement permits the trailing elevons to engage the surface first to absorb the initial shock at touchdown, and to prevent the vehicle from bouncing back into the air. Ground contact is made with the rocker-shaped bottom surface which introduces friction drag and thereby provides a shortened ground run. For emergency landings on land or water, a drag chute may be provided to retard the forward velocity and to add stability during runout.

The modified lenticular form of the re-entry vehicle, having a high hypersonic lift-to-drag ratio provides a wide re-entry corridor thus providing for tolerance of guidance errors and propulsion deficiencies. This high lift-to-drag ratio likewise provides large cross-range and down-range maneuverability, and permits conventional landing techniques thus assuring recovery at a preselected site and possible reuse of the vehicle.

The modified lenticular configuration of the vehicle employs the most efficient shape for a pressure vessel. Thus the construction may comprise a pressure supported shell, thereby reducing the need for frames, stringers and other means of supporting bending loads within the vehicle. The large height-to-width ratio permits maximum utilization of the interior volume. The large leading edge radius reduces the stagnation temperature during re-entry and thus reduces the weight of the necessary heat protection system. The overall shape also provides an ideally stable floating body, facilitating water recovery. The small overall frontal area permits penetration of a water surface from a vertical descent such as is illustrated at FIG. 4; and this eliminates the need for shock absorber means as would be required for a flat landing of a blunt surfaced body.

As explained, the lift-to-drag ratio of the modified lenticular vehicle is controllable from pure ballistic drag at an angle of attack of 90° to a high lift body at low angles of attack, and the widened re-entry corridor achieved by this wide range of lift-to-drag permits relaxation of the accuracy requirements for the guidance system. It follows that the guidance system weight and power requirements can be substantially reduced. The lift-to-drag ratio likewise minimizes the total propellant requirements and attendant accuracy. This, in turn, reduces the weight of onboard propulsion to be carried for maneuvering into position for re-entry. The lift-to-drag ratio also permits reduction of peak re-entry heating. This, in turn, reduces the weight of the requisite heat protection system. The lift-to-drag ratio also permits smoothing out of the re-entry deceleration. This not only reduces the protection required for the crew, but also reduces structural loads to be encountered, and hence the overall structural weight.

An additional advantage of the high and controllable lift-to-drag ratio resides in the maneuverability obtainable during re-entry. This may, in fact, eliminate the need for ground tracking facilities for search and recovery operations, and may eliminate or minimize requirements for upgrading the existing guidance systems. The feasibility of using the aerodynamic controls at hypersonic speeds reduces the weight of the requisite reaction control system and its propellants. The aerodynamic controls permit trimming at any desired attitude, thus eliminating the need for continuous reaction control forces for trim. The control forces build up as the atmosphere density increases, and thus they are larger when the disturbing forces are larger.

The disposition of the windshield in the upper body of the modified lenticular configuration permits the crew, by observation, to orientate themselves and navigate by use of geographic features. Visual contact with the surface facilitates guided flight to the preselected area and permits visual check of the navigation system. This reduces requisite reliance on the navigation and guidance system and allows maneuvering of the vehicle to avoid local obstacles. The visual contact also reduces the requirements for displays and landing aids. It also permits checks in the approach and landing sequences, in the timing, and in the drag chute deployment.

The aerodynamic control provided by the modified lenticular vehicle, coupled with the visibility mentioned above, facilitates selection of the landing site, avoidance of local obstacles, and in fact permits landing at any airport. If it becomes necessary to land elsewhere it permits touchdown at low vertical velocities by making a flare just just prior to impact. If a landing must be made on water, it permits selection of the smoothest water and orientation for the best landing direction. The subsonic maneuverability feature permits loitering during descent and flexibility in timing the touchdown. This may be desirable in order to mesh in with traffic at an airport, or to locate a clearer area.

By being able to avoid collision with local obstacles the need for shock absorption systems on all sides of the vehicle is eliminated. Also eliminated is the possibility of drifting into the side of an obstruction or rolling over after impact. Thus, the possibility of reuse of the vehicle is improved, and requirements for crew protection are reduced.

The spherical or dish form of the bottom of the vehicle provides for an improved shock-absorbing method during normal horizontal landings. The vertical velocity and energy is partially dissipated by a rocking motion of the vehicle due to the convex bottom surface thereof and the position of the aerodynamic control surfaces. This motion, in turn, results in aerodynamic damping and further dissipates energy so as to minimize the peak landing deceleration. Also, the broad base of the vehicle provides improved protection when landing on rough terrain because the large diameter form enables it to bridge for example across furrows of a plowed field or across small ditches, or the like.

The vehicle of the invention is adaptable as a logistics and supply vehicle for large crews and payload. Size increases may be obtained by scaling up all dimensions. The vehicle is suitable for re-entry from escape velocity, from orbital velocity, or from many high altitude sub-orbital conditions. Thus, vehicles of this configuration can be adapted for rendezvous, lunar landings, and planetary exploration simply by employing appropriate propulsion means.

What is claimed is:

1. A space-atmosphere travel vehicle having an external configuration of modified lenticular form generally circular in plan view but truncated at the rear end thereof and having a convex bottom surface and a modified convex upper surface sloped downwardly toward the front end of the vehicle and in side view also truncated at the rear end thereof.

2. A space-atmosphere travel vehicle comprising a body structure having an external configuration of modified lenticular form generally circular in plan view and having wide-rounded leading edge, said body structure consisting essentially of a convex shell shaped bottom portion of relatively high heat resistance capabilities joined to a modified convex shaped upper portion of lower heat resistance capabilities, said upper portion being sloped downwardly at the front end of the vehicle and having windshield means disposed within said sloping portion.

3. A space-atmosphere travel vehicle having an external configuration of modified lenticular form generally circular in plan view and having a convex bottom surface and a modified convex upper surface sloped downwardly at the front end of the vehicle and truncated at the rear end thereof, and separate differentially operable elevons movably mounted upon the vehicle as extensions to the bottom surface thereof at rear opposite sides thereof and being adjustable into the adjacent air stream for pitch and roll aerodynamic control of the vehicle and so disposed behind the main body portion of the vehicle as to be adapted to function as vehicle skid support means when the vehicle is landing on earth or water.

4. A space-to-atmosphere entry vehicle having an external configuration of modified lenticular form generally circular in plan view and having a convex bottom surface and a modified convex upper surface sloped downwardly at the front end of the vehicle and dihedrally disposed plane surfaces at opposite sides of the vehicle adjacent the rear end thereof disposed to act upon the adjacent air stream for stabilizing the vehicle when disposed at high angles of attack relative to its direction of travel.

5. A space-to-atmosphere entry vehicle having an external configuration of modified lenticular form generally circular in plan view and having a convex dish shaped bottom structure of high heat resistance capabilities, and aerodynamic surface means movably mounted upon the rear end of the vehicle at opposite sides thereof and being extendable into the adjacent air stream for aerodynamic control of the vehicle and retractable behind the main body portion of the vehicle to be protected by said bottom structure against overheating when the vehicle is disposed at high angles of attack relative to its direction of travel.

6. A space-to-atmosphere entry vehicle having an external configuration of modified lenticular form generally circular in plan view but truncated at the rear end thereof and having a convex bottom surface and a modified convex upper surface flat sloped downwardly toward the front end of the vehicle and in side view also truncated at the rear end thereof, and movable aerodynamic control surfaces and thrust jet devices carried by said vehicle for attitude control about the pitch and roll and yaw axes thereof.

7. A space-to-atmosphere entry vehicle comprising a body structure having an external configuration of modified lenticular form generally circular in plan view and having wide-rounded leading edge, said body structure consisting essentially of a convex shell shaped bottom portion of relatively high heat resistance capabilities joined to a modified convex shaped upper portion of lower heat resistance capabilities, said upper portion being sloped downwardly at the front end of the vehicle and having windshield means disposed within said sloping portion, and movable aerodynamic control surfaces and thrust jet devices carried by said vehicle for attitude control about the pitch and roll and yaw axes thereof.

8. A space-to-atmosphere entry vehicle having an external configuration of modified lenticular form generally circular in plan view and having a convex bottom surface and a modified convex upper surface sloped downwardly at the front end of the vehicle and truncated at the rear end thereof, and separate differentially operable elevons movably mounted upon the vehicle at rear opposite sides thereof and being adjustable into the adjacent air stream for pitch and roll aerodynamic control of the vehicle and so disposed behind the main body portion of the vehicle as to be adapted to function as vehicle skid support means when the vehicle is landing on earth or water, and thrust jet means carried by said vehicle for attitude control thereof.

9. A space-to-atmosphere entry vehicle having an external configuration of modified lenticular form generally circular in plan view and having a convex bottom surface and a modified convex upper surface sloped downwardly at the front end of the vehicle and dihedrally disposed plane surfaces at opposite sides of the vehicle adjacent the rear end thereof disposed to act upon the adjacent air stream for stabilizing the vehicle when disposed at high angles of attack relative to its direction of travel, and movable aerodynamic control surfaces and thrust jet devices carried by said vehicle for attitude control about the pitch and roll and yaw axes thereof.

10. A space-to-atmosphere entry vehicle having an external configuration of modified lenticular form generally circular in plan view and having a convex dish shaped bottom structure of high heat resistance capabilities, and aerodynamic surface means movably mounted upon the rear end of the vehicle at opposite sides thereof and being extendable into the adjacent air stream for aerodynamic control of the vehicle and retractable behind the main body portion of the vehicle to be protected by said bottom structure against overheating when the vehicle is disposed at high angles of attack relative to its direction of travel, and thrust jet means carried by said vehicle for attitude control thereof.

References Cited in the file of this patent

UNITED STATES PATENTS 2,730,311    Doak _____ Jan. 10, 1956